US008571896B2

(12) United States Patent
Peterson

(10) Patent No.: US 8,571,896 B2
(45) Date of Patent: Oct. 29, 2013

(54) LIFETIME FINANCIAL PRODUCT

(75) Inventor: Donna E. Peterson, Seagrove, NC (US)

(73) Assignee: Wells Fargo Bank, N.A., Charlotte, NC (US)

( * ) Notice: Subject to any disclaimer, the term of this patent is extended or adjusted under 35 U.S.C. 154(b) by 748 days.

(21) Appl. No.: 12/235,897

(22) Filed: Sep. 23, 2008

(65) Prior Publication Data

US 2010/0076791 A1    Mar. 25, 2010

(51) Int. Cl.
*G06Q 40/00* (2012.01)
(52) U.S. Cl.
USPC .................................................. 705/4
(58) Field of Classification Search
USPC .................................. 705/4, 35–45
See application file for complete search history.

(56) References Cited

U.S. PATENT DOCUMENTS

| | | | |
|---|---|---|---|
| 5,631,828 A * | 5/1997 | Hagan | 705/4 |
| 6,064,969 A * | 5/2000 | Haskins | 705/4 |
| 6,611,815 B1 * | 8/2003 | Lewis et al. | 705/36 R |
| 7,398,241 B2 * | 7/2008 | Fay et al. | 705/36 R |
| 7,908,196 B2 * | 3/2011 | Bevacqua, Jr. | 705/36 R |
| 8,024,248 B2 * | 9/2011 | Stiff et al. | 705/36 R |
| 8,099,349 B1 * | 1/2012 | Johnson | 705/36 R |
| 8,204,767 B2 * | 6/2012 | Dellinger et al. | 705/4 |
| 8,234,132 B2 * | 7/2012 | Kravitz et al. | 705/4 |
| 8,364,570 B1 * | 1/2013 | Johnson | 705/36 R |
| 8,370,242 B2 * | 2/2013 | Stiff et al. | 705/36 R |
| 8,412,545 B2 * | 4/2013 | Stiff et al. | 705/4 |
| 8,438,046 B2 * | 5/2013 | Mahaney et al. | 705/4 |
| 2006/0106698 A1 * | 5/2006 | Mahaney et al. | 705/35 |
| 2006/0212380 A1 * | 9/2006 | Williams et al. | 705/35 |
| 2007/0239583 A1 * | 10/2007 | Williams | 705/36 R |
| 2008/0010095 A1 * | 1/2008 | Joyce | 705/4 |
| 2008/0052133 A1 * | 2/2008 | Kravirtz et al. | 705/4 |
| 2008/0319885 A1 * | 12/2008 | D'Anna et al. | 705/35 |
| 2009/0271224 A1 * | 10/2009 | Lange | 705/4 |

OTHER PUBLICATIONS

Bennett, Douglas, "Something Extra: Purchasing longevity insurance can extend retirees' financial good life, but the industry has to design the right product first", Bests Review, Mar. 2006, pp. 1-3.*
Milevsky, Moshe. A, "Real Longevity Insurance with a Deductible: Introduction to Advanced- Life Delayed Annuities", Managing Retirement Symposium (SoA), 2004 (19 pges).*
"Met Life Introduces "Longevity Insurance" to Help Protect against Outliving Retirement Savings in Later Years", Business Wire [New York], Sep. 15, 2004, pp. 1-3.*
Kukinki, Lisa, "Longevity Insurance—An Innovative Way to Market Annuities", Agent's Sales Journal (Jul. 2007), pp. 1-4.*
"Annuity-Like CD cleared for Insurance by FDIC—A Wall Street Journal News Roundup", Wall Street Journal [New York, N.Y], May 17, 1994, p. A22.*
Insurance-After-Cobra-Ends.com. 2008. Annuity Keeps Paying and Paying and Paying and . . . <http://www.insurance-after-cobra-ends.com/Annuity.html>, last accessed Dec. 29, 2008. 3 pages.

(Continued)

*Primary Examiner* — Mohammad Z Shaikh
(74) *Attorney, Agent, or Firm* — Kegler Brown Hill & Ritter; James J. Pingor

(57) ABSTRACT

A system and method that offers a simple product solution for managing financial risks in retirement is provided. The product solution combines a uniquely structured deposit product (e.g., certificate of deposit (CD)) together with an insurance policy (e.g., group longevity insurance policy) to guarantee a lifetime stream of income to a customer.

9 Claims, 7 Drawing Sheets

(56) References Cited

OTHER PUBLICATIONS

Todorova, A. SmartMoney. Jun. 14, 2008. Extend your Retirement Savings. <http://www.smartmoney.com/personal-finance/insurance/extend-your-retirement-savings-19628/>, last accessed Dec. 29, 2008. 3 pages.

Milevsky, M., Abaimova, A. Distribution Think Tank. Jun. 19, 2005. Applied Risk Management During Retirement. 37 pages.

* cited by examiner

LIFETIME FINANCIAL PRODUCT

BACKGROUND

A certificate of deposit (CD) refers to a time (or term) deposit which, most often, cannot be withdrawn (without penalty) until the expiry of a designated period of time or 'term.' CDs are offered to customers by financial institutions such as banks, credit unions, etc. During the term, the CD funds earn interest, usually a higher interest rate than that available via conventional savings accounts.

Similar to conventional savings accounts, CDs are insured by the FDIC (Federal Deposit Insurance Corporation) or NCUA (National Credit Union Administration), therefore, they are virtually risk-free. The term of a CD can vary, for example, three months, six months, one year, two years, up to 5 years or greater. During the term, in exchange for agreeing to leave the money in the CD, the customer is usually offered a higher fixed interest rate than is available for monies available for withdrawal on-demand (e.g., savings accounts), although, adjustable rates are sometimes available as well.

Today, there are many financial options available to retirees as well as to those planning for retirement. While many individuals employ conventional mechanisms such as interest-bearing savings and mutual fund accounts, many have opted to use CDs to assist in funding their retirement. Most often, individuals rely upon the interest of CDs to fund their living expenses. In other words, once a CD matures, the principal is often rolled into another CD while the accrued interest becomes available living expenses. As can be imagined, this cycle can continue and enable a retiree to fund, or otherwise supplement, retirement expenses.

Unfortunately, this practice can be problematic for individuals who cannot generate enough income for their basic retirement living expenses or do not know how to manage their savings to last their lifetime. They end-up in an attempt to insure their own longevity by diligently shopping financial institutions for the highest interest rate possible in attempt to maximize income. This is also a problem for financial institutions. As will be understood, this rate is not always available at the same financial institution. Thus, money is often moved from bank to bank throughout the cycle thereby reducing the 'stickiness' (e.g., retention) of funds for the institution.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system and/or product (and corresponding methodology) that employs a uniquely structured certificate of deposit (CD) product to offer an individual guaranteed lifetime income. In particular examples, the innovation couples a "payout" CD with longevity insurance (or alternatively an annuity) to effectively guarantee a lifetime stream of income. In accordance therewith, systematic withdrawals can be taken from the CD over the course of a customer's retirement years until the balance is depleted. The amount of the systematic withdrawal may be designed to remain the same, regardless of changes in interest rates upon renewal of the CD. Upon balance depletion, the insurance continues the established withdrawal payments for the remaining lifetime of the customer. In the event the client takes an additional withdrawal from the CD during the payout period, the guaranteed withdrawal amount can be reduced accordingly.

In another aspect of the subject innovation the innovation provides a financial vehicle by which a customer can generate income for their lifetime through a uniquely designed financial product. The product combines uniquely structured CD products with longevity insurance to provide a customer with a lifetime payout. Conventional CD products require customers to remain invested in the CD until the end of the CD term (e.g., its "maturity"). In a conventional CD, withdrawals occurring prior to maturity are subject to an early withdrawal penalty. The "payout" CD product is designed to generate systematic withdrawals during the CD term that are exempt from early withdrawal penalties. Thus, customer's financial security can be addressed by providing a lifetime stream of income while, at the same time, increasing the 'stickiness' (e.g., retention) of money for financial institutions.

In yet another aspect thereof, a machine learning and reasoning component is provided that employs a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
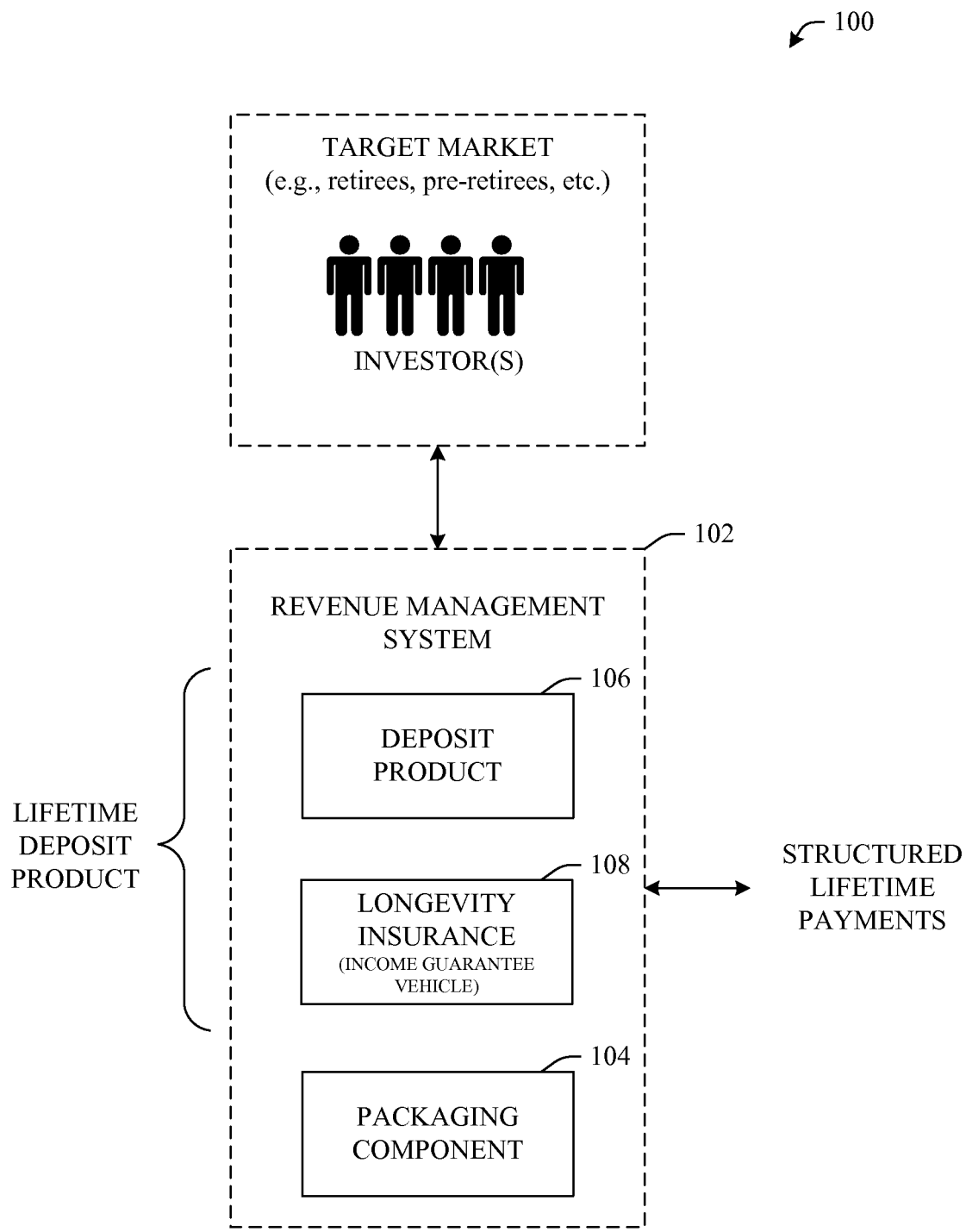
FIG. 1 illustrates an example system that facilitates a lifetime stream of income in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As an introduction, the innovation can address financial concerns of individuals, particularly, in their retirement years. For instance, suppose a 67-year old retiree is trying to live on Social Security payments supplemented solely with investment earnings because she worries that she will outlive her retirement funds. In this scenario, the retiree can purchase a Lifetime CD (certificate of deposit) from a financial institution and begin to receive an additional monthly payment almost immediately. In accordance with the innovation, this additional payment can continue throughout her lifetime. The retiree now feels confident that she can cover her retirement living expenses. A longevity policy (or other income guarantee vehicle) that is included in the Lifetime CD will continue to provide her a stream of income long after the CD is depleted.

Outliving retirement savings is a top concern for most people entering retirement. By offering a guaranteed income starting at a predetermined point in time, one of the biggest unknowns can be taken out of the customer's retirement planning strategy, namely how long their money should last. The innovation, e.g., Lifetime CD product, combines this future income guarantee with systematic withdrawals from a commonly used bank deposit product, providing the client the ability to spend down their retirement assets without running out of income.

As will be understood, managing retirement income offers a significant opportunity for financial services firms. Although firms are aggressively preparing for and pursuing the 'Boomer' opportunity, providers are aligning to serve the affluent segment, leaving the mass affluent segments underserved.

In aspects, the Lifetime CD product of the innovation can target the mass affluent market, a demographic with a heightened need to manage retirement income. However, it is to be appreciated that the Lifetime CD product may span across multiple market segments as most people in a target age group (e.g., age 55 or older) are most often familiar with certificates of deposit. Most of the affluent investors and certainly the mass market investors are likely to require downside protections and income generation solutions to complement, or, in some cases replace traditional solutions.

Research has shown that households with between $100,000 and $500,000 in net worth hold 60% of their assets in bank products such as CDs. CD penetration has been seen to be the highest (e.g., 33%) among the affluent client base. The Lifetime CD will offer a winning combination of a familiar product in a packaged solution, reasonable pricing, and simplicity, obtained from a trusted brand.

Referring initially to the drawings, FIG. 1 illustrates a system 100 that facilitates generation of a lifetime deposit product in accordance with aspects of the innovation. As illustrated, the system 100 employs a revenue management system 102 to offer a lifetime financial product that is capable of guaranteeing a stream of income throughout the life of a customer. Essentially, the lifetime deposit product combines a deposit product such as a certificate of deposit or CD together with an insurance product such as longevity insurance.

The innovation offers a steady stream of dependable income to retirees and other customers. In other words, the innovation provides liquidity with the ability to withdraw additional funds at any time, oftentimes subject to premature withdrawal penalty. By doing so, the Lifetime CD overcomes one of the primary barriers that prevent retirees from buying income annuities, loss of control.

As described above, in a conventional sense, a CD refers to a time (or term) deposit which, most often, cannot be withdrawn without penalty until the expiry of a designated period of time or 'term.' CDs are offered to customers by financial institutions such as banks, credit unions, etc. During the term, the CD funds earn interest, usually a higher interest rate than that available via conventional savings accounts. Unfortunately, the CD product does not lend itself to use as an effective and/or efficient retirement income planning mechanism. For at least this reason, the innovation discloses a coupling of a deposit product (e.g., "payout" CD) structured to accommodate systematic withdrawals with an insurance product, for example, longevity insurance designed to guarantee the continuation of these systematic withdrawals for the customer's lifetime.

Longevity insurance essentially provides a manner by which a policyholder can insure against financial ruin arising from longevity. The policy is designed to pay to the policyholder a benefit upon survival to a pre-established future age. Contrary to other life annuity products, longevity insurance, as known in the art, is a policy that is designed to pay out upon a policyholder reaching much later years, for example, most often 80 or 85 years of age.

By combining a payout CD together with an income guarantee vehicle such as longevity insurance, the owner (or policyholder) can be effectively guaranteed payment throughout their life regardless of the availability of principal in the CD itself. In other words, conventionally, many elderly people would use CDs in an effort to fund their retirement years by living off the principal and/or interest. Unfortunately, once the principal and/or interest were exhausted, there were no additional monies available.

Referring first to an aspect that combines an annuity with a payout CD, it will be appreciated that, income annuities provide protection against longevity risk by pooling the mortality risk of everyone who purchases an annuity. Some annuity purchasers will die before reaching their normal life expectancy, which offsets the costs to the insurer of paying income to those who live longer than their normal life expectancy.

However, despite offering a guaranteed income, no matter how long the purchaser may live, the market for income annuities remains relatively small (e.g., accounted for $12 billion of the more than $212 billion in annuity sales in 2005).

Conventional annuity products can be complex and inflexible. Purchasing an annuity is not without risks—the purchaser loses control of the assets upon annuitization and the annuity premium may be forfeited to the insurer upon death. Plus, the purchaser is exposed to credit risk from contracting with a single insurer.

Similarly, longevity insurance provides another option to obtain guaranteed income, typically starting after age 80-85, in exchange for an initial investment made some 20 years earlier. A basic, and traditional, longevity insurance product has no death benefit, inflation adjustment or withdrawal options.

For both income annuities and longevity insurance, the terms of the financial product contracts that would offer the guarantees investors find attractive require that investors give up control over their wealth. With the Lifetime CD, retirees will always have control over funds held in the CD, and in lieu of a one-time up front premium payment for longevity protection, the Lifetime CD spreads the cost over the term of the CD withdrawals. More particularly, the innovation describes combination of a payout CD with an insurance product, such as an annuity or longevity insurance policy.

In aspects, the Lifetime CD offers a simple solution for managing financial risks, specifically, longevity, market and potentially inflation risks, in retirement through a combination of a group insurance policy and a bank deposit product. The bank product can be an automatically renewable CD (e.g., payout CD) that supports systematic withdrawals of principal in an amount anticipated to deplete the account balance at age 85 (or other specified age). In embodiments, the rate period may use a series of rate renewals (e.g., 5 year rate guarantee) or may include a single rate term. The systematic withdrawal rate will be set based on factors such as the initial interest rate, and the client's age. Interest is most often also distributed with the systematic withdrawal. Interest accrued but not paid is added to the balance until distributed in later years. The interest rate can be adjusted for ongoing payment of a fee (e.g., insurance premium) to guarantee continuation of payments once the CD balance is exhausted. Alternatively, ongoing fee payments can be deducted from the balance of the CD or another account.

In one example, the financial institution can own the "longevity policy" that provides the lifetime income guarantee. In other examples, the customer can own the policy. The policy will likely be underwritten by a third party. In yet another example, the insurance can be funded by the financial institution. Some benefits of the Lifetime CD are listed below:

Overcomes many of the barriers that prevent retirees from buying income annuities—such as complexity and loss of control.

Offers steady stream of dependable income.

Allows retiree to spend down principal to maximize lifestyle without fear of outliving their retirement savings.

Provides liquidity with ability to withdraw funds at any time, subject to a premature withdrawal penalty.

Offers FDIC protection on covered balances in the CD.

Delivers better financial management for retirees, providing a better living standard to those who would be hesitant to spend down principal otherwise.

The Lifetime CD can be right for people who need a monthly income, just as they had when they were working. It would also appeal to people who fear they lack the financial expertise to make their savings last a lifetime. The Lifetime CD can help people cope financially with several risks—longevity, market risk, and, potentially, inflation. The payment structure also helps add financial discipline to curb the risk of overspending for retirees who may find it difficult to resist the urge to dip into the nest egg and withdraw too much too early. In the event of a joint CD (e.g., husband and wife), adjustments may be made (for example, systematic payments may be lower or the insurance premium may be increased) to accommodate guaranteed lifetime withdrawals covering both spouses.

In accordance with the innovation described herein, a packaging component 104 can be employed to combine a deposit product 106 together with longevity insurance 108 based upon a customer's needs, desires or preferences. This combination guarantees payment to a customer throughout existence. In operation, the packaging component 104 can be employed to calculate an installment payment rate or amount (or annuity) based upon a number of factors, including but not limited to, initial CD principal, applicable CD interest rate, age of customer, life expectancy, etc. Additionally, the packaging component 104 can also be used to identify an appropriate longevity insurance policy or other product that triggers to continue the payments upon depletion of CD funds. Additionally, by design, the longevity insurance will be designed to trigger upon the policyholder either depleting their CD balance through the allowable systematic withdrawals or reaching a pre-defined age, e.g., 80 or 85. It is to be understood that the point at which the longevity insurance (or annuity) kicks in will vary. The payout rate used to calculate the amount of systematic withdrawals may be based on the initial interest rate and systematic withdrawals will continue at that rate regardless of how interest rates change over time. Thus, it will be appreciated that there may be no pre-defined age for the insurance to take over. However, the initial payout rate will be set based on assumptions regarding the overall duration of the CD.

With regard to a longevity insurance policy, the benefit is most often paid in the form of an installment or annuity for the remainder of the policyholder's life. However, it is to be understood that, alternative payment types and schedules can be provided in accordance with the terms of a specific policy. These alternative aspects are to be included within the scope of this innovation and claims appended hereto. Essentially, the innovation can be viewed as a mechanism by which retirees can hedge economically against living to an age at which they may have diminished financial resources.

Figure 2:
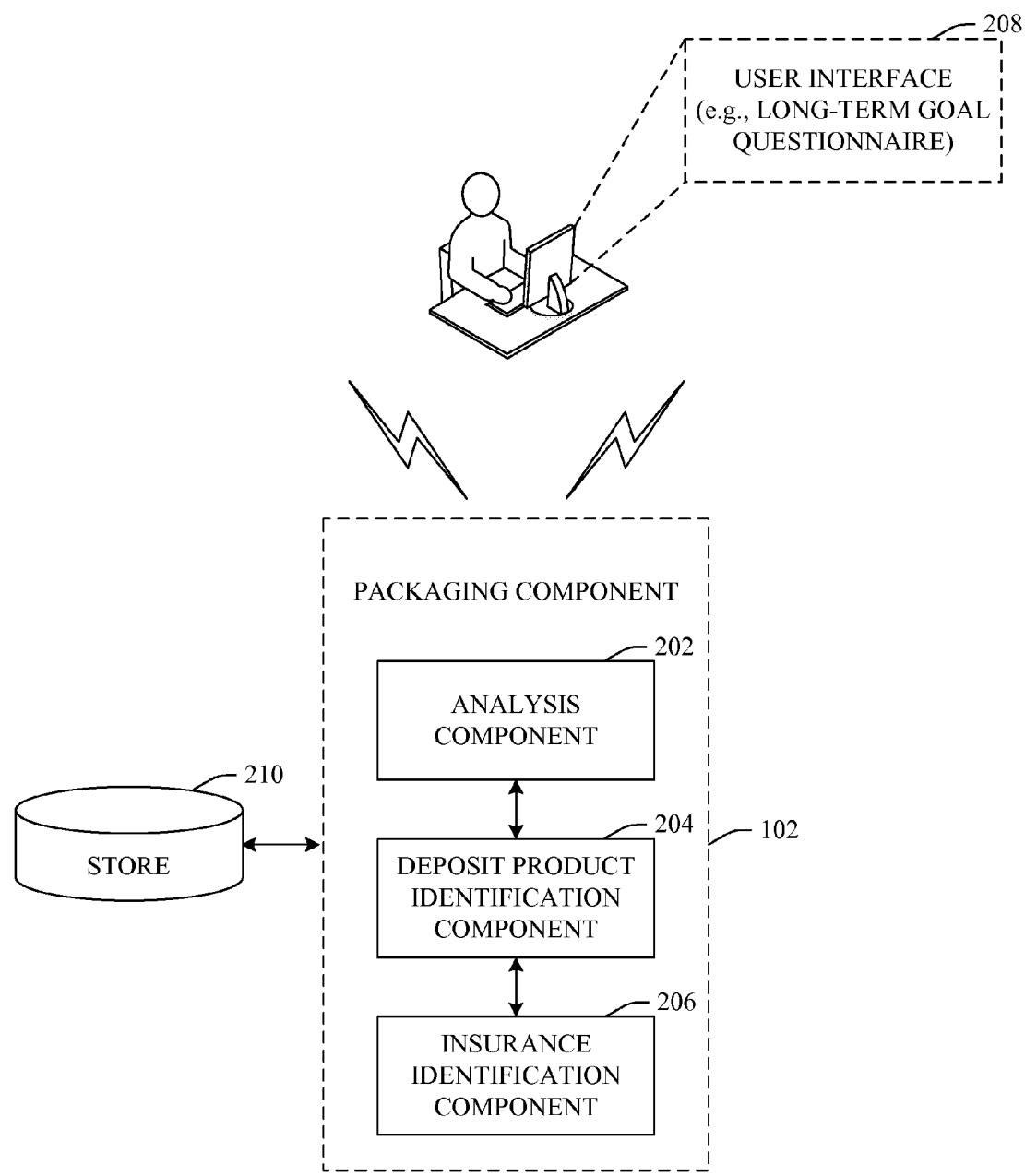
FIG. 2 illustrates an example system that employs a user interface to gather customer information in accordance with an aspect of the innovation.

Turning now to FIG. 2, a block diagram of an example packaging component 102 is shown in accordance with aspects of the innovation. As shown, packaging component 102 can include an analysis component 202, a deposit product identification component 204 and an insurance identification component 206. Together, these sub-components (202, 204, 206) enable configuration of a financial product that can effectively protect the financial viability of a customer, for example, an elderly individual.

In operation, a user interface (UI) 208 can be employed to provide an input mechanism by which a user (e.g., customer, financial planner . . . ) can enter information. This information can be in response to a long-term goal questionnaire or the like. Additionally, the UI can be employed to provide a mechanism by which a user can prompt establishment of a lifetime financial product. Additionally, or alternatively, the information can be retrieved from a store 210, application (not shown) or other suitable input mechanism. In all, the information can be processed by the analysis component 202 together with the deposit product and insurance identification components (204, 206) to establish a lifetime financial product offering.

Once established, in the event that the customer opts to accept the offering, the product can provide lifetime installment (or annuity) payments to the customer. As described above, the customer would commit a principal amount into an applicable CD product. The CD will have pre-assigned or negotiated interest rate of return that may be tied to a specified market index. Additionally, a longevity insurance policy can be coupled to the backend of the CD such that, once the CD funds are depleted, the insurance policy will trigger to provide the policyholder with a lifetime benefit equal to (or substantially equal to) the CD installment payments. While the examples described herein are directed to a single deposit product, it is to be understood that the features, functions and benefits can leverage a 'laddering' technique of deposit products without departing from the spirit and/or scope of the innovation and claims appended hereto.

Additionally, it is to be understood that alternative payment amounts can be structured in accordance with the CD and/or insurance policy. As well, the frequency of payments can fluctuate as desired, pre-determined or negotiated. Still further, payment amounts can fluctuate from payment to payment based upon a product feature or a customer need, desire or the like. Regardless of the amount or frequency of the payments, the overall features, functions and benefits of the innovation are such that, once the CD funds are depleted, the insurance benefit is triggered to continue payment throughout the life of the individual.

Figure 3:
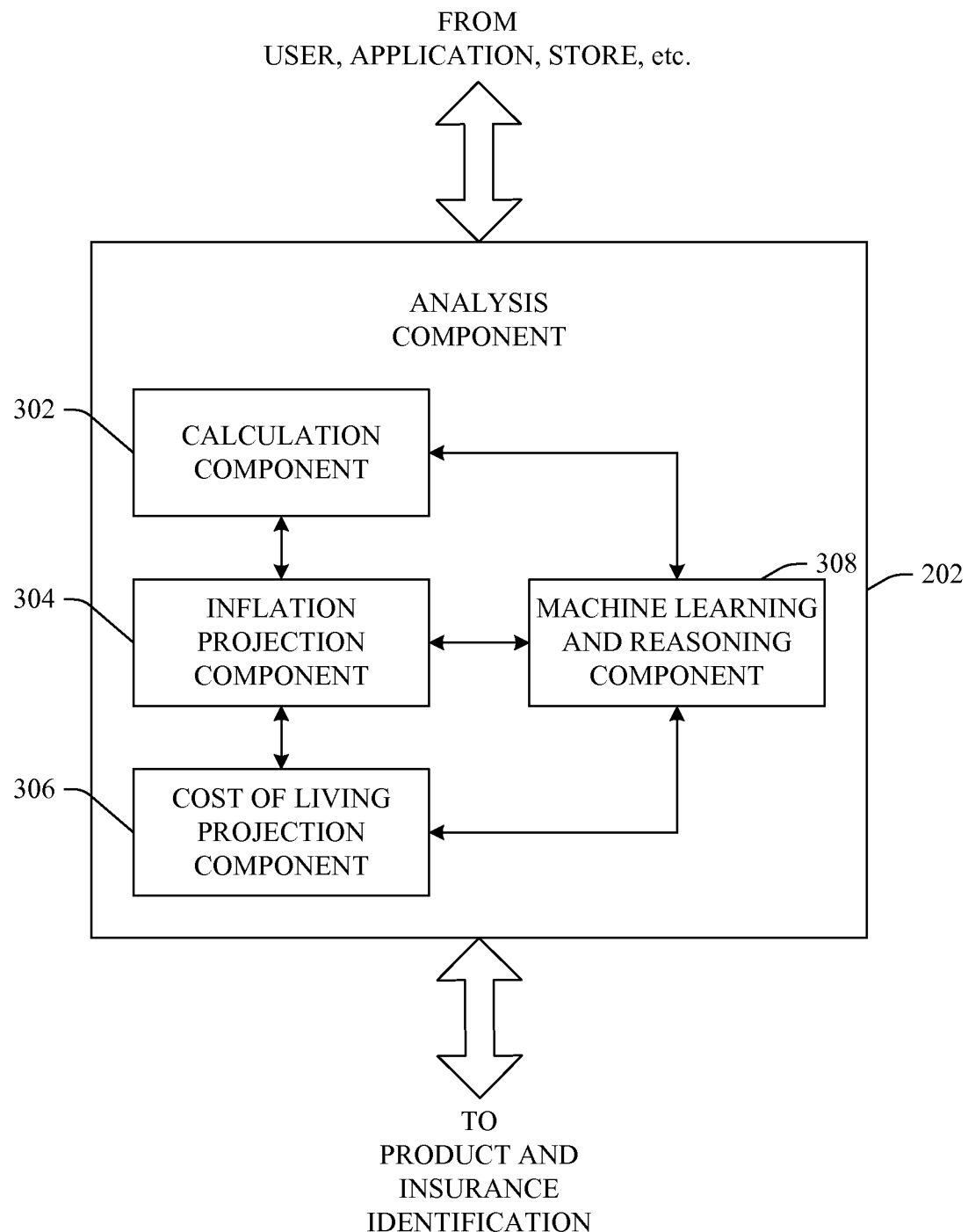
FIG. 3 illustrates an example analysis component in accordance with an aspect of the innovation.

As well, cost of living and inflation factors can be considered in calculating applicable parameters (e.g., rate of return, premium amount, frequency of payment, amount of payment . . . ). Additionally, the analysis component 202 can evaluate and otherwise factor in parameters including, but not limited to, life expectancy, mortality, lapse rate, administrative costs, interest rate trends, etc. These alternative aspects are to be considered within the scope of the innovation and claims appended hereto. FIG. 3 illustrates an example analysis component 202 that incorporates these factors.

As shown in FIG. 3, analysis component 202 can include a calculation component 302, an inflation projection component 304 and a cost of living projection component 306. Additionally, and optionally, the analysis component 202 can include a machine learning and reasoning (MLR) component 308 that is capable of automating one or more features as described herein.

The calculation component 302 can effectively include logic that is capable of establishing specifications for products based upon information received from a user, customer, candidate, application, store, etc. For instance, the calculation component 302 can be used to establish applicable principal amount(s), installment amount(s) and frequency, etc. based upon a customer's desire or preference. In particular examples, the calculation component 302 can consider a customer's age, health, relationship with the financial institution, account status, or the like in establishing product parameters.

The inflation and/or cost of living projection components (304, 306) facilitate financial projections that permit compensation for economic changes and/or fluctuations. Essentially, the components (304, 306) can access and evaluate economic information and standards thereby establishing potential compensation factors. The factors can be employed to set, modify or otherwise adjust installment amounts, frequency, etc. associated with the features, functions and benefits of the innovation.

FIG. 3 also illustrates that analysis component 202 can include an MLR component 308 which facilitates automating one or more features in accordance with the subject innovation. The subject innovation (e.g., installment amount modification, frequency . . . ) can employ various MLR-based schemes for carrying out various aspects thereof. For example, a process for determining when/if to increase/decrease a frequency amount can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when/if to increase or decrease an installment amount, when/if to increase or decrease installment frequency, etc.

Figure 4:
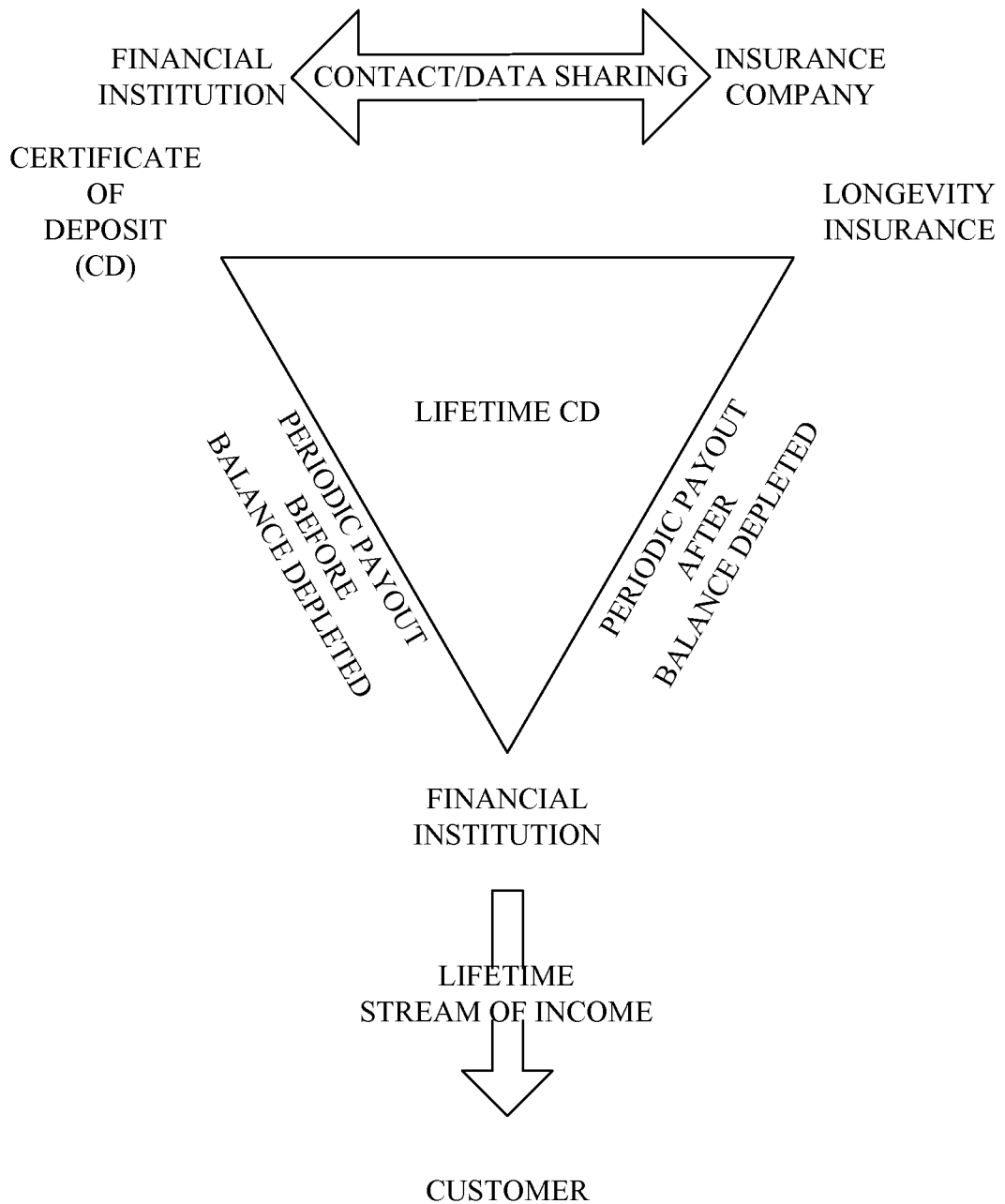
FIG. 4 illustrates an example lifetime certificate of deposit (CD) product that guarantees a lifetime stream of income in accordance with an aspect of the innovation.

FIG. 4 illustrates an example graphical illustration of the lifetime deposit product (e.g., lifetime CD) in accordance with the innovation. Essentially, FIG. 4 graphically illustrates that a CD can be combined with longevity insurance to effectuate a lifetime CD. In accordance with the features, functions and benefits of the innovation, the lifetime CD product can provide a stream of income to an individual throughout their lifetime. It will be appreciated that payments can be made by the financial institution, insurance company, third party or any combination thereof without departing from the scope of the innovation described herein.

In operation, the CD can provide periodic payments (e.g., installments, annuities) before, during and after a balance of the CD is depleted. In other words, periodic installments can be provided in accordance with a determined (or inferred) amount and frequency until the total value (e.g., principal and interest) of the CD is exhausted. Once exhausted, a periodic payout can be paid in accordance with the terms of the applicable longevity insurance policy. It is to be understood that these payments can be the same or different in amount and frequency as those paid under the CD. Essentially, the terms of the longevity insurance can be used to set payment parameters post-CD.

Figure 5:
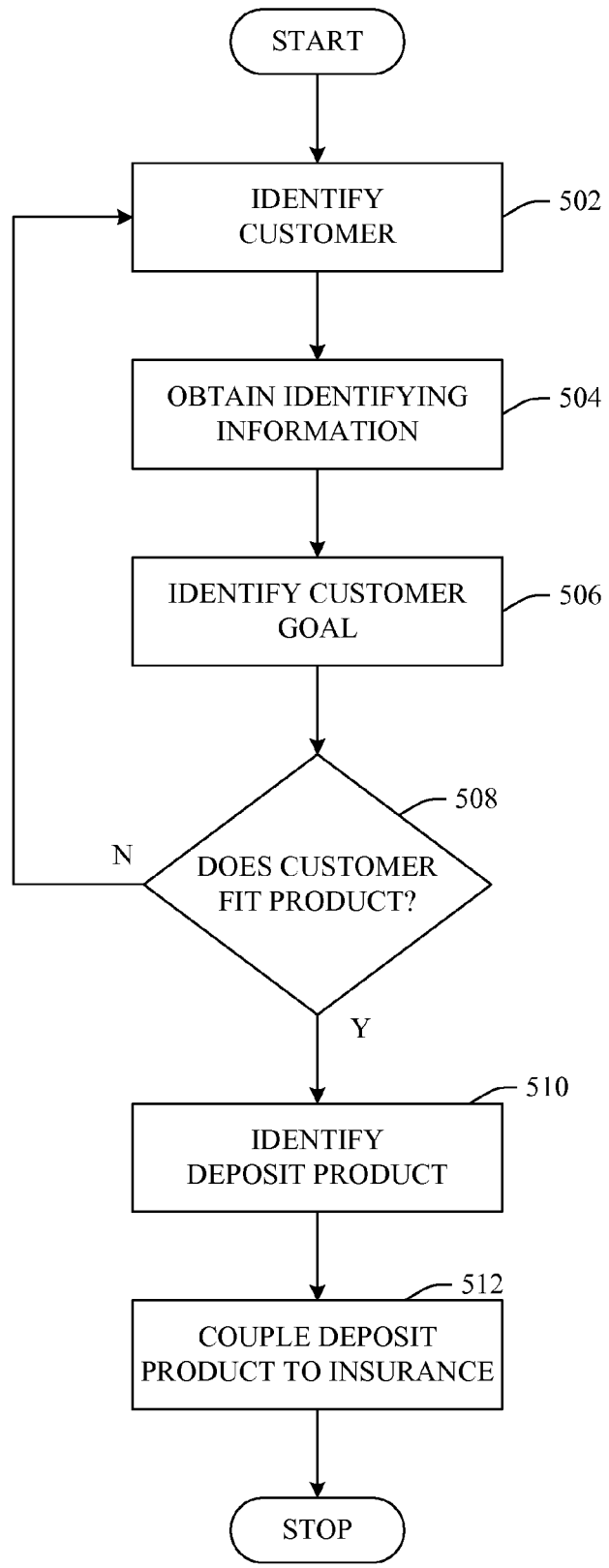
FIG. 5 illustrates an example flow chart of procedures that facilitate packaging a lifetime CD product in accordance with an aspect of the innovation.

FIG. 5 illustrates a methodology of establishing a lifetime deposit product in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 502, a customer is identified, for example, a retiree or pre-retiree who would most likely fit the target class for a lifetime deposit product. It will be understood that historical data can be used to identify a customer. For instance, surveys can be conducted to identify individuals that conventionally used CDs to fund retirement and income in their later years. As described above, many customers that originally used CDs as a retirement investment (e.g., who live off the interest) often engage in rate shopping when their CDs reached maturity. This rate shopping decreased the 'stickiness' of money for financial institutions. Thus, the innovation, by providing an incentive of lifetime payments, can increase the 'stickiness' of money for financial institutions. Effectively, the innovation can shift the focus of CDs from a short-term 'investment' to a vehicle to produce retirement income for the rest of their life.

Information that identifies the customer can be gathered at 504. Here, a UI or other information gathering technique can be employed to gather data. In other aspects, financial institution records can be employed to provide data related to an existing customer. Data can include, but is not limited to, name, age, identification numbers, account(s), length of patronage, cost of living, profitability, credit worthiness, outstanding debts, etc.

The customer's goals can be gathered at 506. Here, information can be gathered that identifies factors that can contribute to determination of installment amount, frequency, etc. A decision is made at 508 to determine if the customer fits the demographic for a Lifetime CD product. If not, the methodology returns to 502 to identify another customer.

However, if the customer fits the target group, at 510, a deposit product or product bundle can be identified that fits the customer based upon age, desires, and other goal factors. It is to be understood that, in aspects the financial institution may require an account be opened, e.g., a checking account to be used in depositing systematic withdrawals from the lifetime CD. For instance, for a customer that is currently 68 years of age, a CD duration of 12 to 17 years (or even 20 years) may be appropriate. For another customer who is 70 years of age, a 10 to 15 year CD duration may be appropriate. In either case, the final CD term will expire when the account balance is exhausted or reaches a pre-determined minimum amount, at which time longevity insurance can take over. While many of the examples described herein are triggered and reliant upon a single individual's life (and age), it is to be understood that more complex products (e.g., Joint Lifetime CDs) can be provided which correspond to additional individuals lives. Most often, these products will adjust insurance policy premiums or withdrawal amounts based upon the ages of the contracting parties. These alternative products are to be included within the scope of this disclosure and claims appended hereto.

At 512, the deposit product or CD is coupled to an appropriate insurance product, for example, longevity insurance. It will be understood that standard insurance underwriting practices can be employed to select and attach an applicable insurance product. As described supra, once the value of the CD is depleted, the insurance can trigger to provide payments or installments throughout the customer's living existence. It will be understood that, if desired, riders can be employed to compensate for factors such as, but not limited to, cost of living increases or inflation protection.

In alternative aspects, the customer can purchase the longevity product in conjunction with, but separate from, the CD. Here, the longevity insurance can be packaged to the CD but, provided by a third party insurance company. In another example, a financial institution can independently secure or guarantee the lifetime stream of income. Still further, it is possible for the financial institution to guarantee the stream of income with the customer while insuring the funds itself with a third party insurance company.

Figure 6:
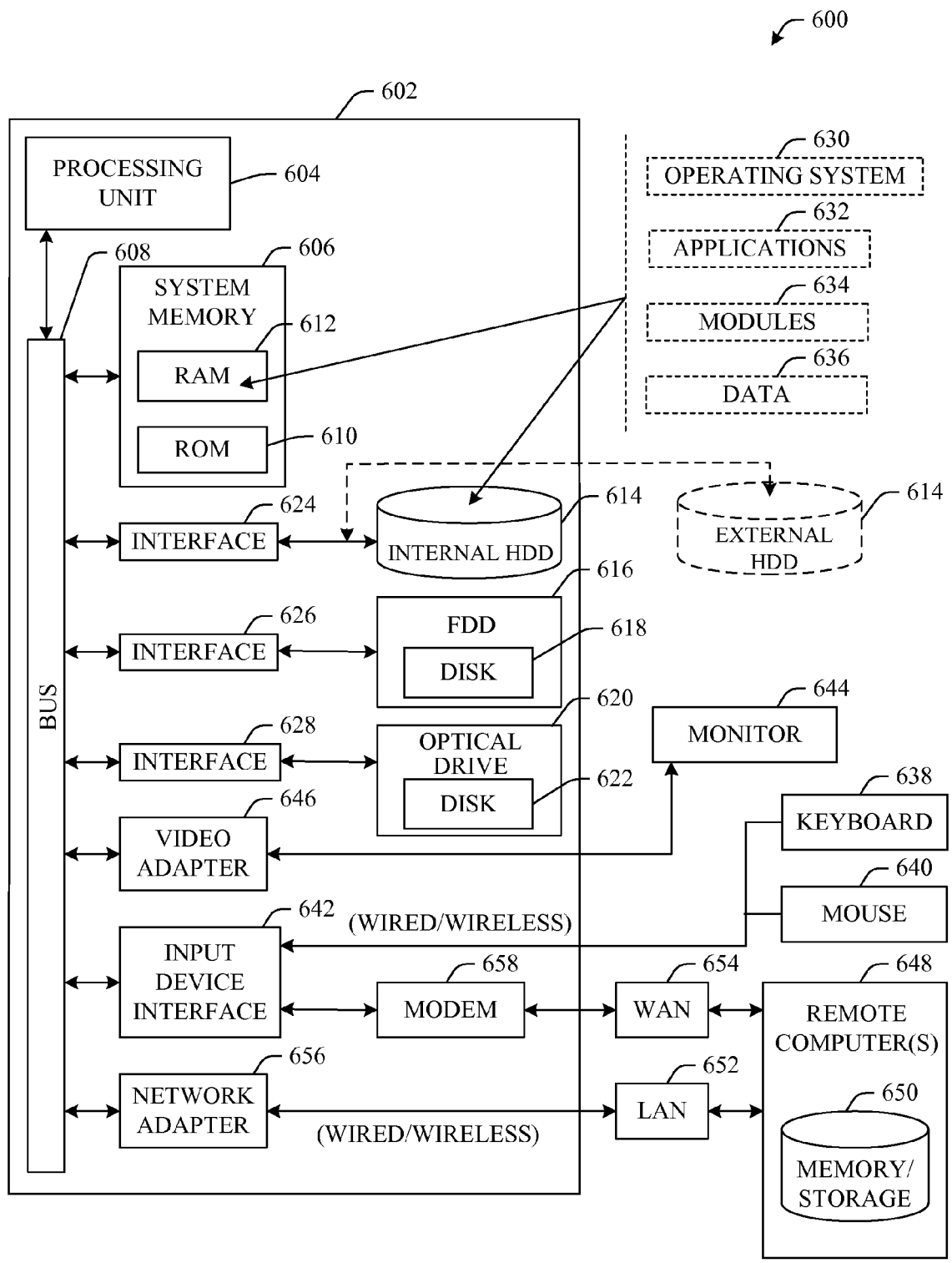
FIG. 6 illustrates a block diagram of a computer operable to execute the disclosed architecture.

Referring now to FIG. 6, there is illustrated a block diagram of a computer operable to execute the disclosed architecture. In order to provide additional context for various aspects of the subject innovation, FIG. 6 and the following discussion are intended to provide a brief, general description of a suitable computing environment 600 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 6, the exemplary environment 600 for implementing various aspects of the innovation includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read-only memory (ROM) 610 and random access memory (RAM) 612. A basic input/output system (BIOS) is stored in a non-volatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 612, including an operating system 630, one or more application programs 632, other program modules 634 and program data 636. All or portions of the operating system, applications, modules, and/or data can also be cached in the RAM 612. It is appreciated that the innovation can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers, etc.

The computer 602 may operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which may connect to a global communications network, e.g., the Internet.

When used in a LAN networking environment, the computer 602 is connected to the local network 652 through a wired and/or wireless communication network interface or adapter 656. The adapter 656 may facilitate wired or wireless communication to the LAN 652, which may also include a wireless access point disposed thereon for communicating with the wireless adapter 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wired or wireless device, is connected to the system bus 608 via the serial port interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 7:
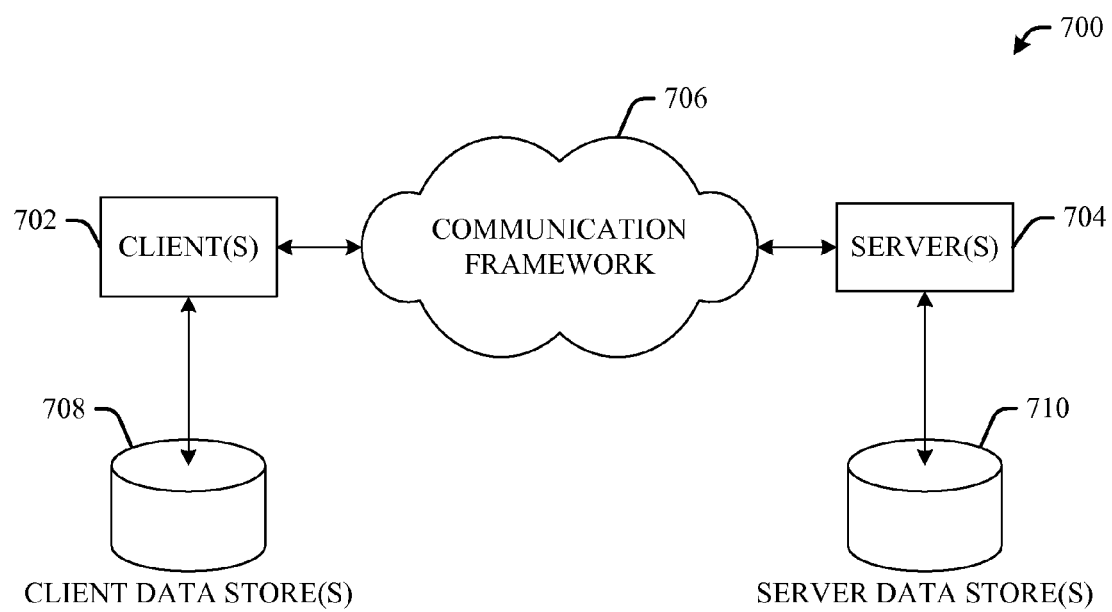
FIG. 7 illustrates a schematic block diagram of an exemplary computing environment in accordance with the subject innovation.

Referring now to FIG. 7, there is illustrated a schematic block diagram of an exemplary computing environment 700 in accordance with the subject innovation. The system 700 includes one or more client(s) 702. The client(s) 702 can be hardware and/or software (e.g., threads, processes, computing devices). The client(s) 702 can house cookie(s) and/or associated contextual information by employing the innovation, for example.

The system 700 also includes one or more server(s) 704. The server(s) 704 can also be hardware and/or software (e.g., threads, processes, computing devices). The servers 704 can house threads to perform transformations by employing the innovation, for example. One possible communication between a client 702 and a server 704 can be in the form of a data packet adapted to be transmitted between two or more computer processes. The data packet may include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A revenue management system that facilitates a lifetime income stream, comprising:
at least one processor coupled to a memory, the processor executing:
a user interface component that facilitates input of demographic information associated with a life of a customer;
an analysis component that produces an evaluation of the demographic information;
a deposit product identification component that identifies a deposit product based at least in part upon the evaluation, wherein the deposit product is an interest-bearing certificate of deposit (CD);
an insurance identification component that identifies a longevity insurance policy based at least in part upon the analysis and wherein the longevity policy is established concurrently with the deposit product;
a packaging component that combines the deposit product with the longevity insurance policy; and
a calculation component that calculates a plurality of initial interval payments associated with the deposit product,
wherein the calculation component calculates a plurality of reduced interval payments associated with the deposit product after a requested withdrawal payment,
wherein the deposit product and the longevity insurance policy in combination guarantee the lifetime income stream based upon the life of the customer, and wherein the longevity insurance policy provides a guaranteed payment of the lifetime income stream during the life of the customer upon exhaustion of an initial deposit associated with the deposit product together with applicable interest earned.

2. The revenue management system of claim 1, wherein: the deposit product offers the income stream to the customer as a function of the initial deposit together with an interest rate.

3. The revenue management system of claim 2, wherein the CD is structured to provide systematic withdrawals of principal and interest during a term of the CD.

4. The revenue management system of claim 2, wherein the deposit product is structured to have a duration covering one or more automatically-occurring renewals of the deposit product.

5. The revenue management system of claim 2, wherein the interest rate is a fixed interest rate.

6. The revenue management system of claim 2, wherein the interest rate is a variable interest rate.

7. The revenue management system of claim 1, further comprising an inflation projection component that estimates inflation based at least in part upon economic factors, wherein the calculation component employs the inflation in computation of the plurality of initial interval payments and the plurality of reduced interval payments.

8. The revenue management system of claim 1, further comprising a cost of living projection component that estimates a cost of living increase based at least in part upon economic factors, wherein the calculation component employs the increase in computation of the plurality of initial interval payments and the plurality of reduced interval payments.

9. The system of claim 1, further comprising a machine learning and reasoning component that employs at least one of a probabilistic and a statistical-based analysis that infers the plurality of initial interval payments and the plurality of reduced interval payments.

* * * * *